No. 890,953. PATENTED JUNE 16, 1908.
H. Y. ARMSTRONG.
GUM WRAPPING MACHINE.
APPLICATION FILED DEC. 6, 1906.
9 SHEETS—SHEET 2.

Witnesses:

Inventor.
Harry Y. Armstrong
his Attys.

No. 890,953. PATENTED JUNE 16, 1908.
H. Y. ARMSTRONG.
GUM WRAPPING MACHINE.
APPLICATION FILED DEC. 6, 1906.

9 SHEETS—SHEET 5.

Witnesses:
N. J. Barrett
M. W. Hall

Inventor:
Harry Y. Armstrong
by Rob W. Brown
his Atty

No. 890,953. PATENTED JUNE 16, 1908.
H. Y. ARMSTRONG.
GUM WRAPPING MACHINE.
APPLICATION FILED DEC. 6, 1906.
9 SHEETS—SHEET 6.
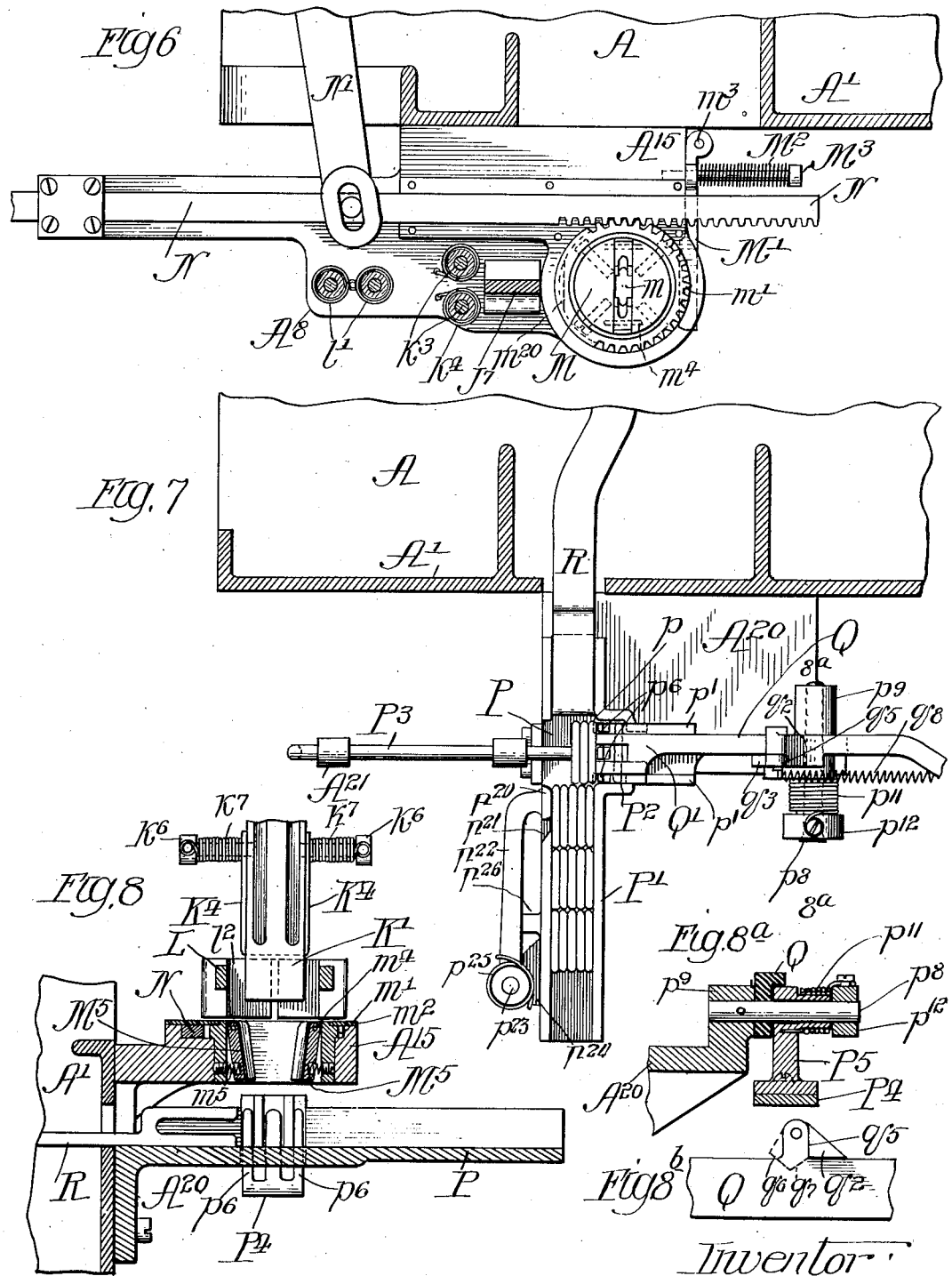
Witnesses:
Inventor:
Harry Y. Armstrong.
by Poole Brown
his Attys

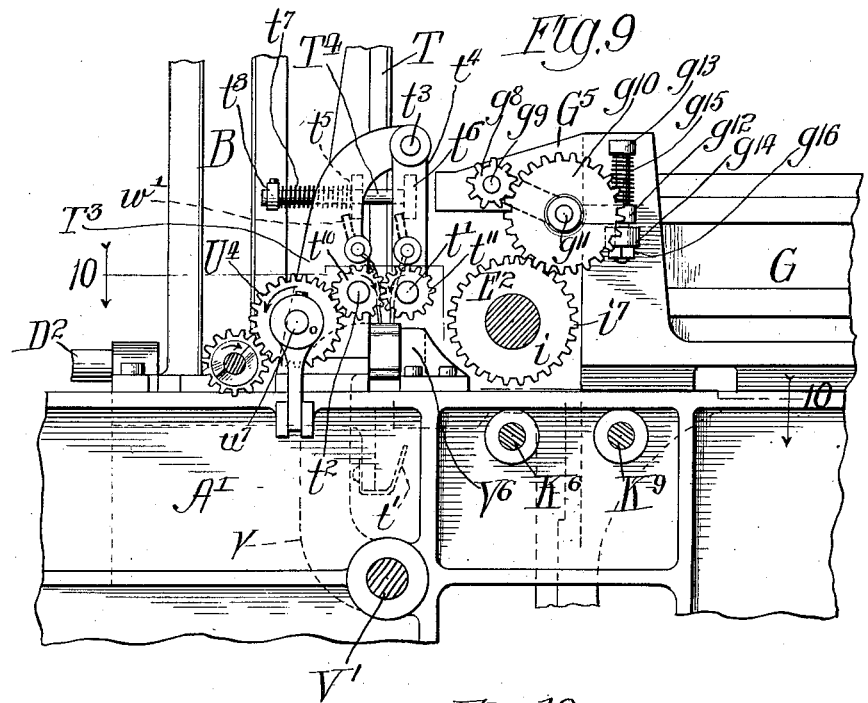
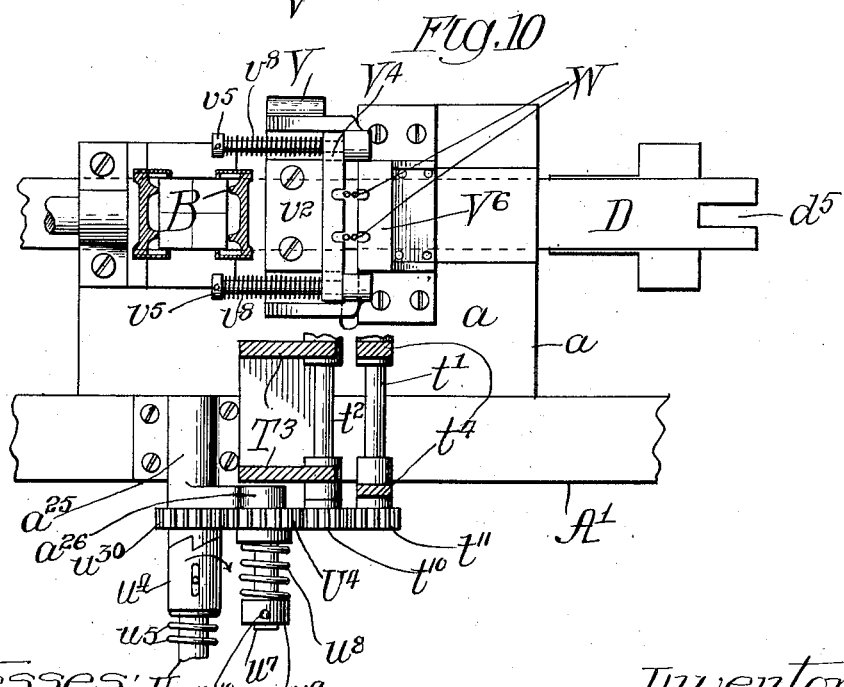

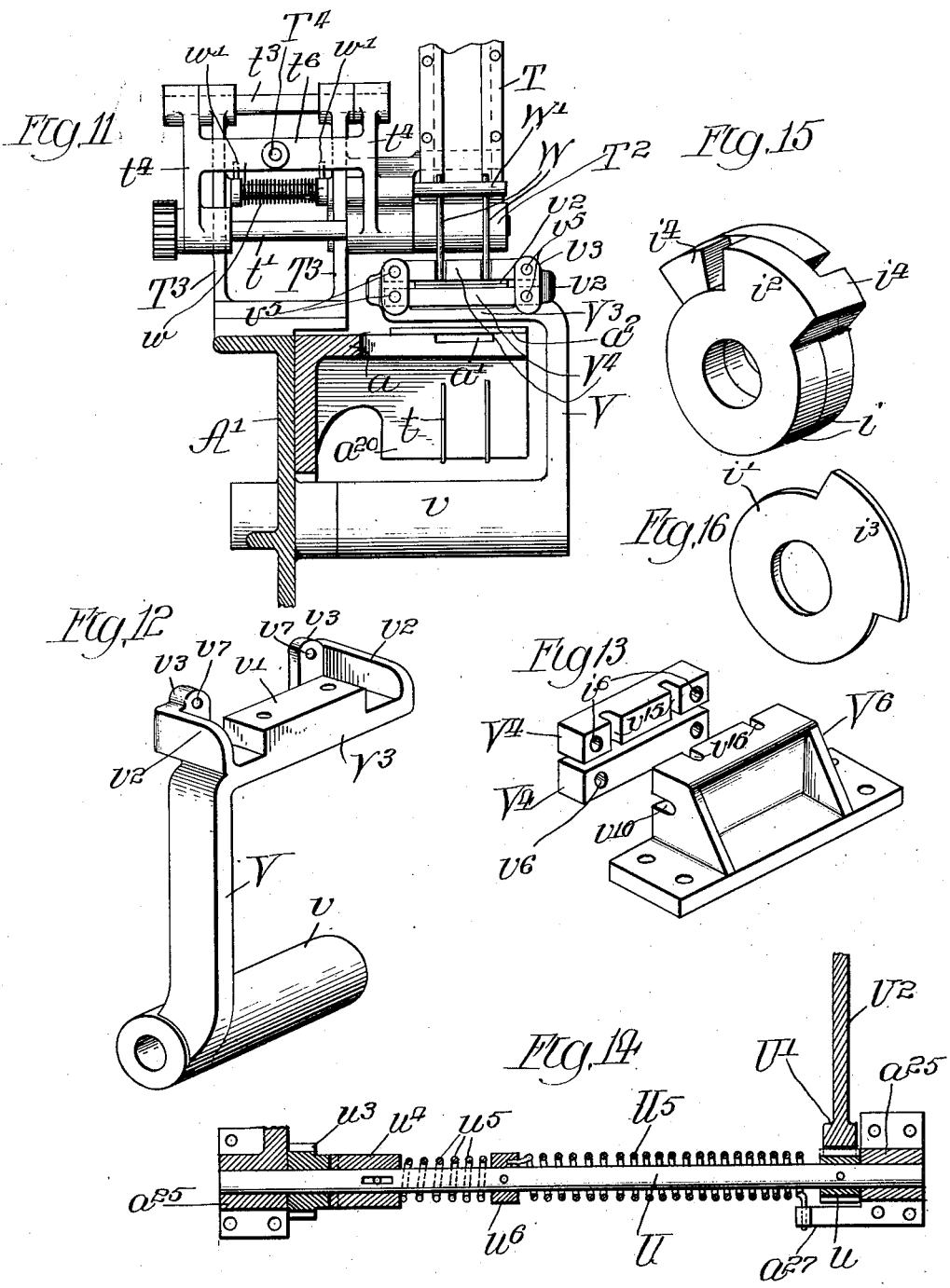

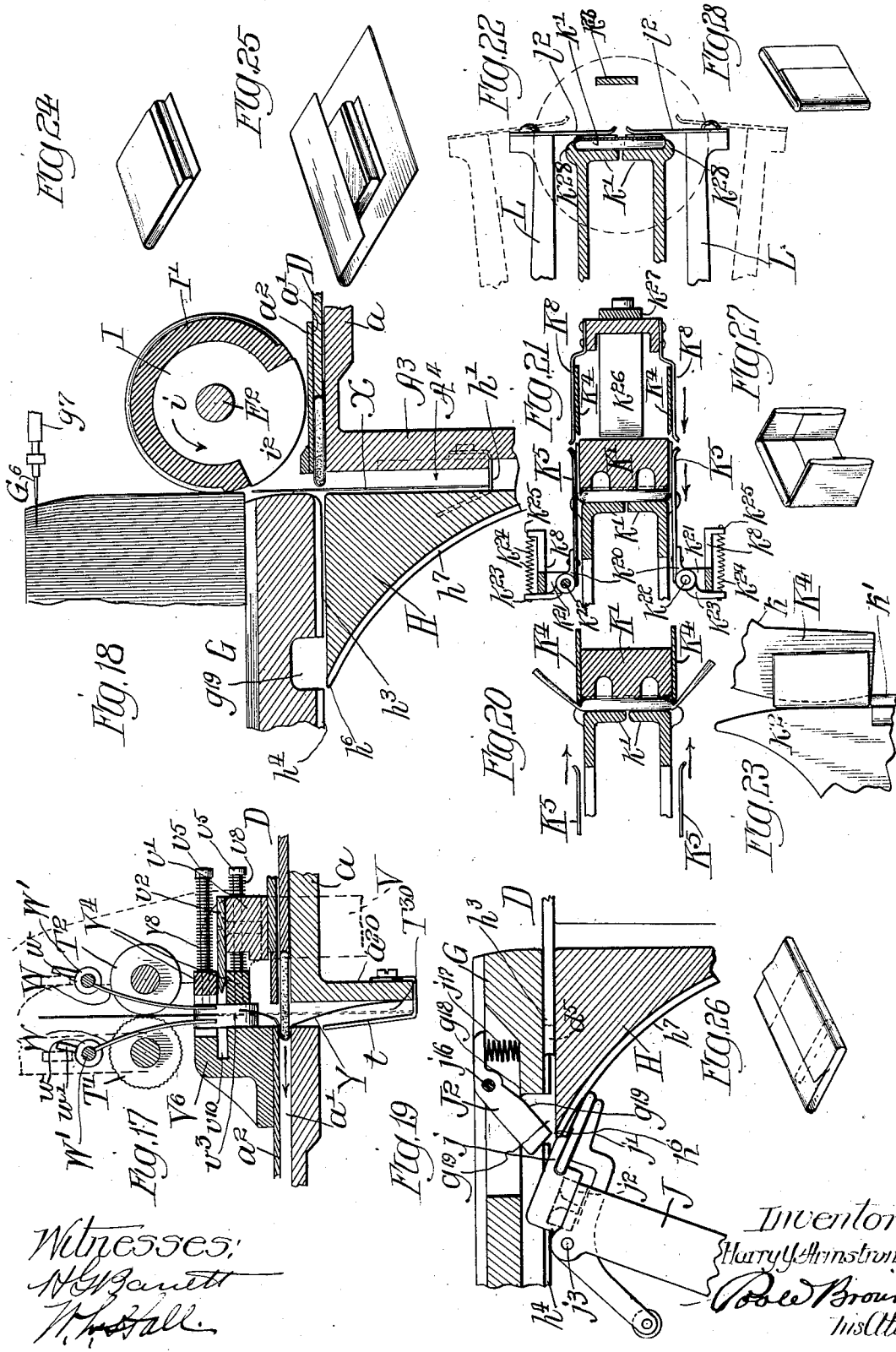

UNITED STATES PATENT OFFICE.

HARRY YARRINGTON ARMSTRONG, OF ELGIN, ILLINOIS.

GUM-WRAPPING MACHINE.

No. 890,953.  Specification of Letters Patent.  Patented June 16, 1908.

Application filed December 6, 1906. Serial No. 346,534.

*To all whom it may concern:*

Be it known that I, HARRY YARRINGTON ARMSTRONG, a citizen of the United States, of Elgin, in the county of Kane and State of Illinois, have invented certain new and useful Improvements in Gum-Wrapping Machines; and I do hereby declare that the following is a full, clear, and exact description thereof, reference being had to the accompanying drawings, and to the letters of reference marked thereon, which form a part of this specification.

This invention relates to improvements in wrapping machines of the general type shown in my prior application for United States Letters Patent filed March 21st, 1906, Serial Number 307,240. The machine herein shown and that shown in said prior application is adapted for wrapping small thin articles such as sticks of chewing gum, confections and the like.

Among the general objects of my invention is to simplify and improve the construction and operation of a wrapping machine of this character; to improve the construction and operation of the wrapping mechanism and to improve the mechanism for assembling the wrapped gums in groups of a predetermined number of gums, and discharging the groups from the machine.

Other objects of the invention will appear from the following description.

The invention consists in the matters hereinafter set forth and more particularly pointed out in the appended claims.

Figure 1:
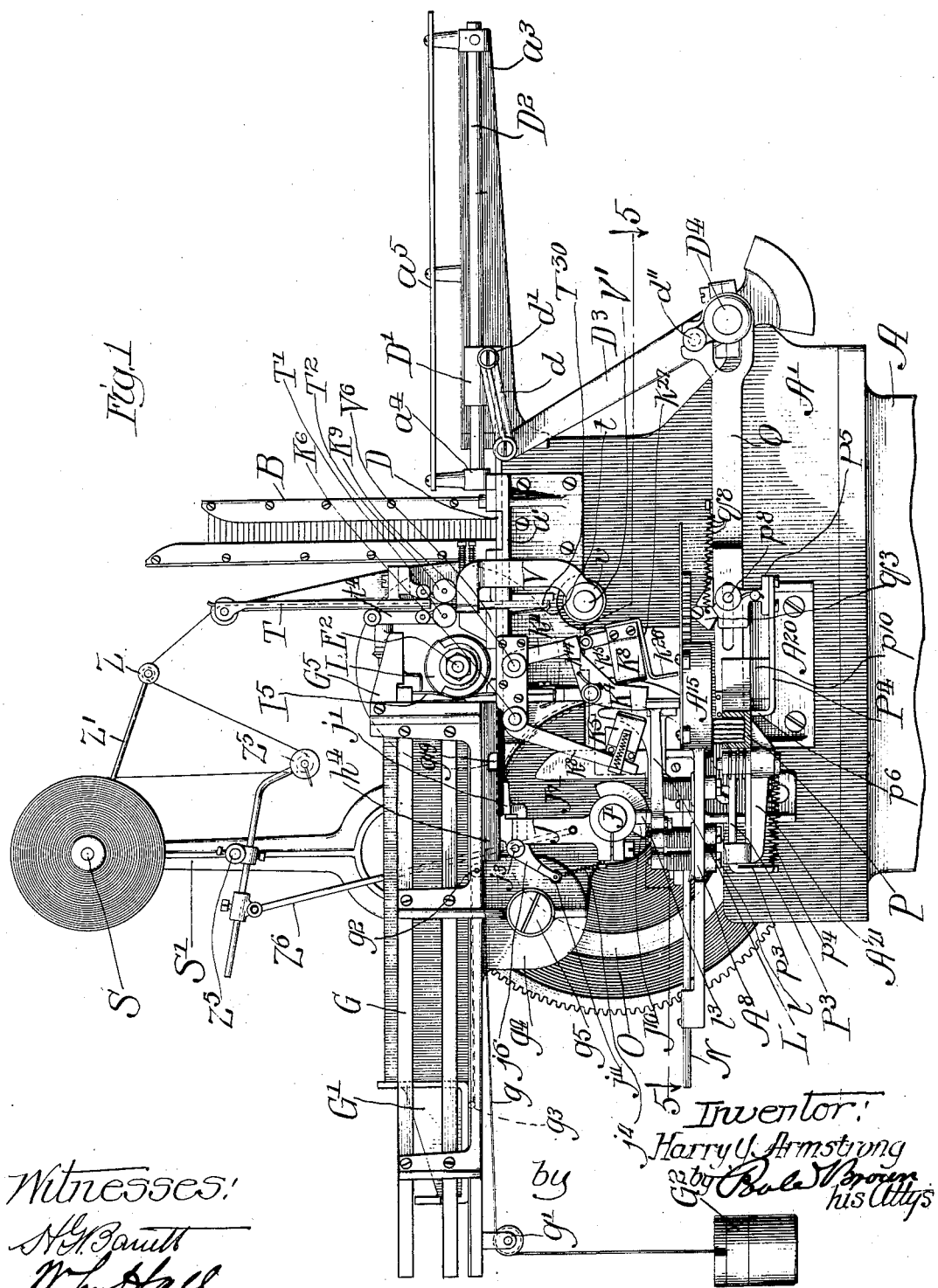
Figure 2:
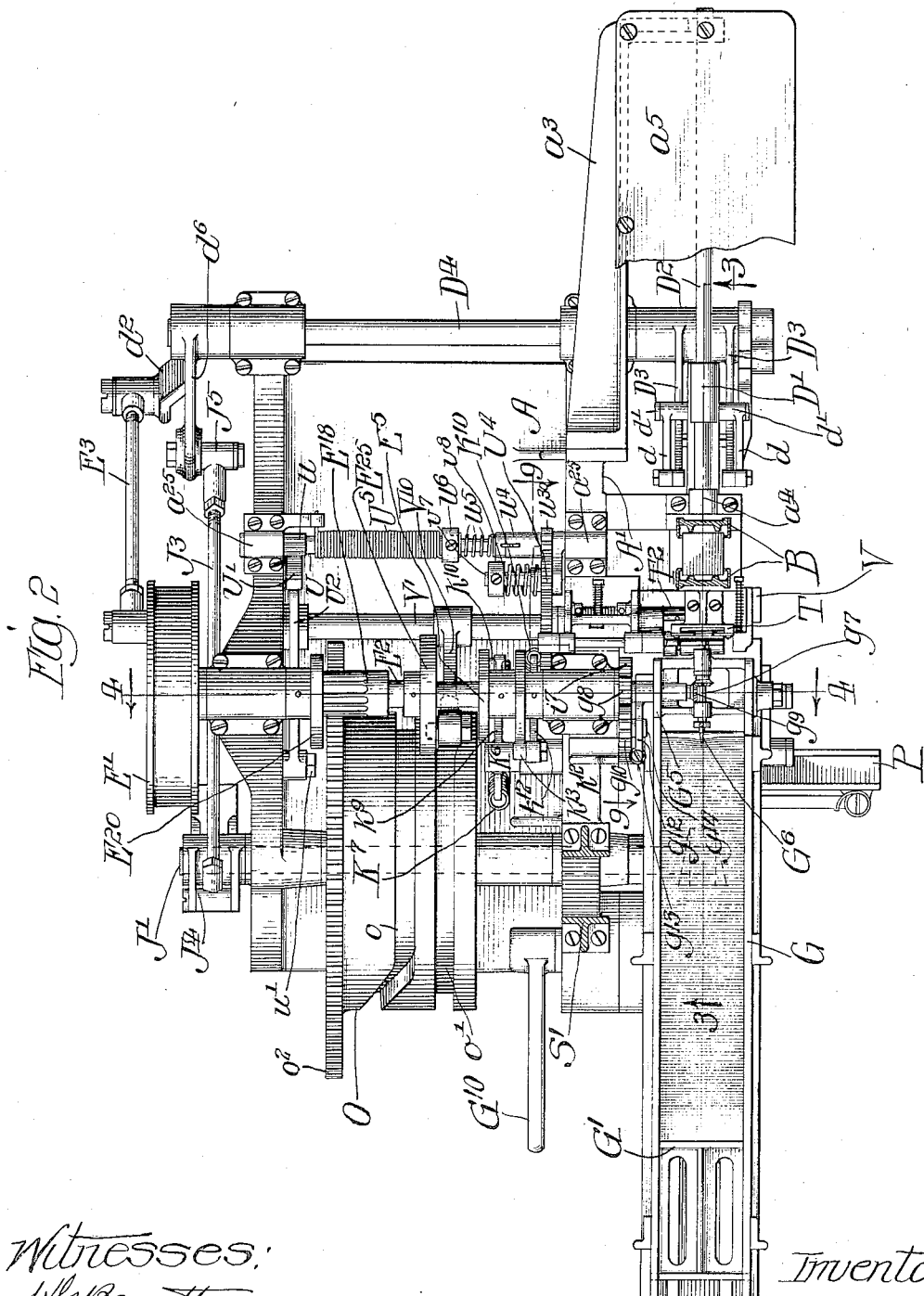
Figure 3:
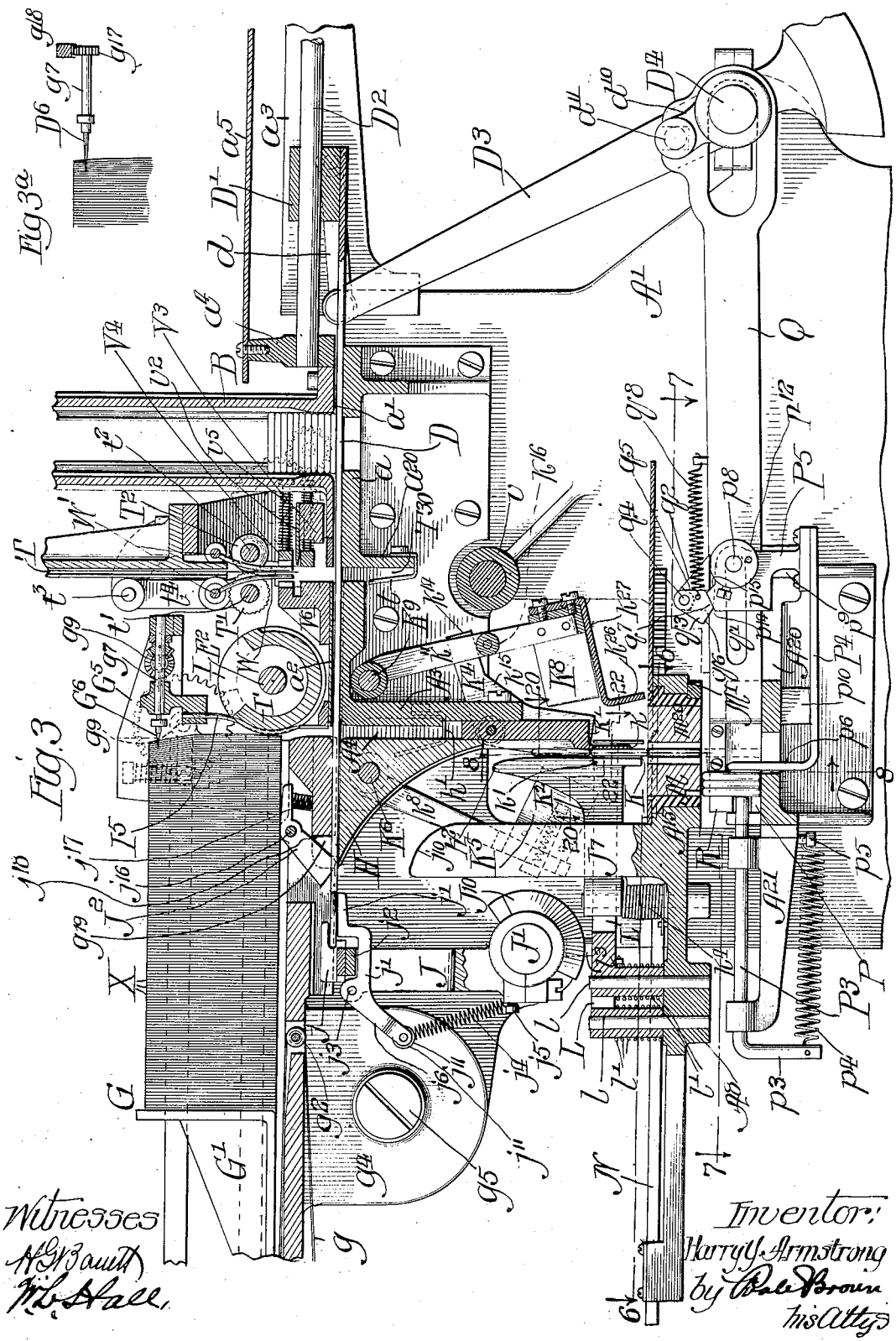
Figure 4:
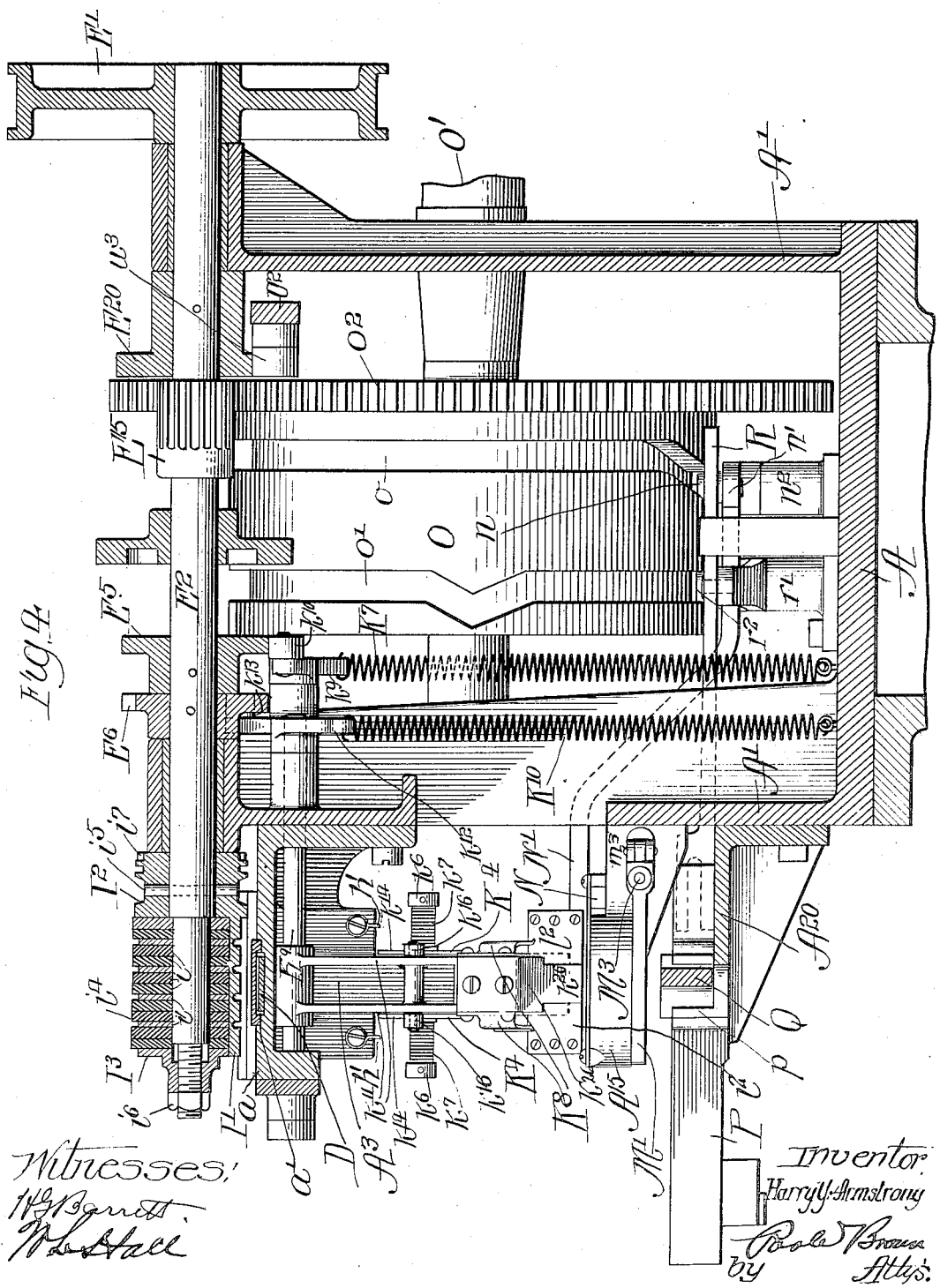
Figure 5:
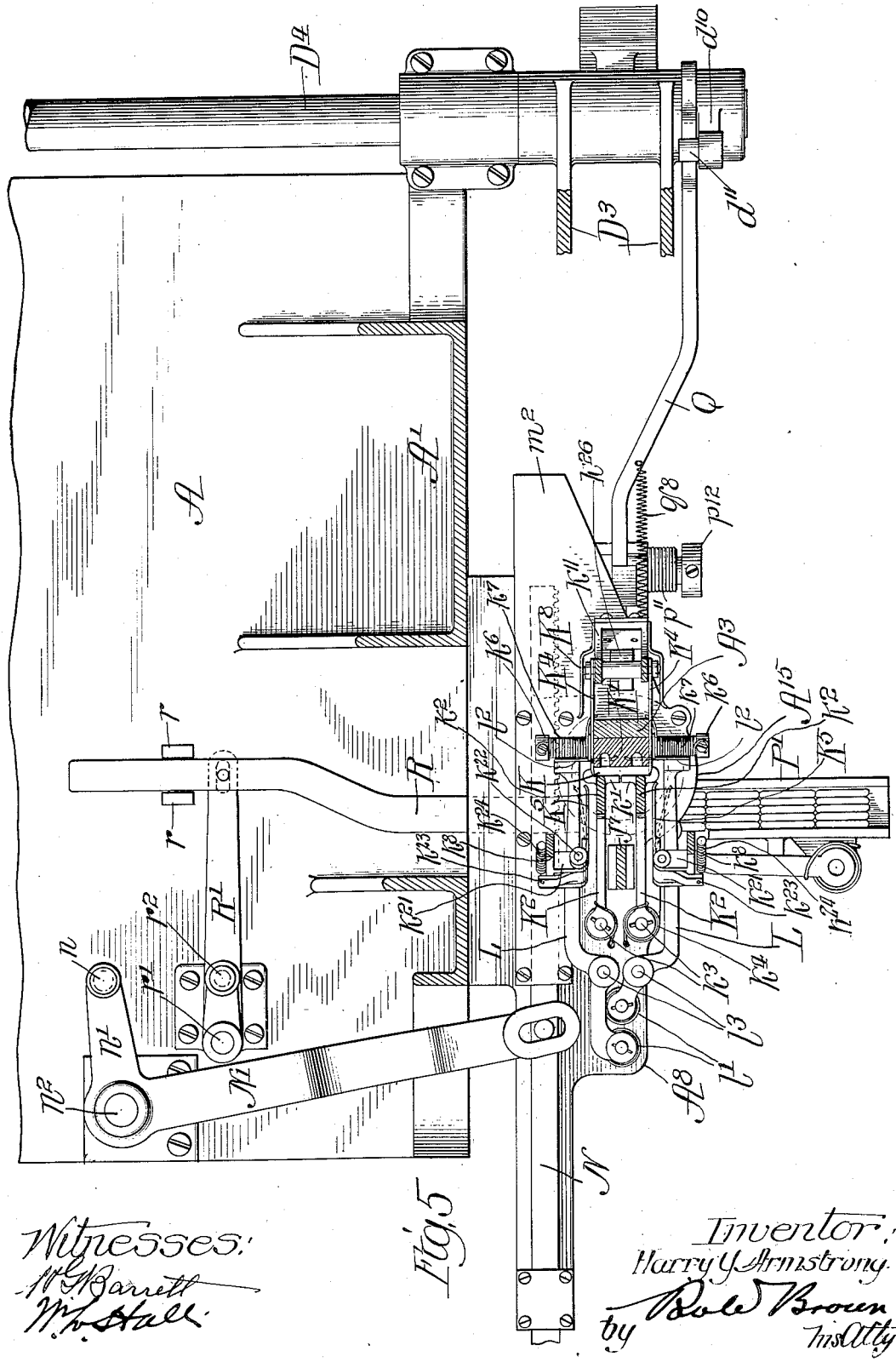

In the drawings:—Figure 1 is a side elevation of the wrapping machine embodying my improvements. Fig. 2 is a top plan view thereof. Fig. 3 is an enlarged longitudinal, vertical section, taken on line 3—3 of Fig. 2. Fig. 3ª is a modification of the means for preventing the stripping of more than one wrapper at a time from the magazine. Fig. 4 is an enlarged, transverse section, taken on line 4—4 of Fig. 2. Fig. 5 is a detail plan section, taken on line 5—5 of Fig. 1. Fig. 6 is a plan view illustrating the turn-table for reversing end to end one of the gums of a group or pack, and mechanism for operating the same, said view being taken on line 6—6 of Fig. 3. Fig. 7 is a plan view of the assembling mechanism and discharge chute, taken on line 7—7 of Fig. 3. Fig. 8 is a detail, vertical section, taken on line 8—8 of Fig. 3. Fig. 8ª is a detail section, taken on line 8ª—8ª of Fig. 7. Fig. 8ᵇ is a detail of the assembling plunger, hereinafter to be described. Fig. 9 is a vertical section, taken on line 9—9 of Fig. 2, illustrating the inner wrapper feeding mechanism. Fig. 10 is a horizontal section, taken on line 10—10 of Fig. 9. Fig. 11 is a detail section of the inner wrapper feed mechanism showing the cutting knife and means for operating the same, and a portion of the feed roller mechanism. Fig. 12 is a perspective view of the arm that carries and operates the inner wrapper knife. Fig. 13 illustrates the stationary and movable clamping jaws that hold the inner wrapper while it is being cut. Fig. 14 is a detail of the spring feed shaft that actuates the feed rollers to feed the inner wrapper into the path of the gum. Fig. 15 is a perspective view illustrating one pair of the friction sections of the stripper roller for stripping the outer wrappers from the magazine and depositing them into the path of the gums. Fig. 16 is a perspective view of one of the rings or disks for separating adjacent pairs of the rubber sections of said feed roller. Fig. 17 is a vertical section, taken through the stationary and yielding clamping jaws that clamp the inner wrapper while it is being cut, illustrating also the cutting knife and the rollers for feeding the wrapper strip between said jaws. Fig. 18 is a detail illustrating the relation of the stripper roller for the outside wrapper to the magazine in which said wrappers are contained. Fig. 19 is a vertical, sectional detail illustrating a dog located at the extreme throw of the gum feed bar for preventing the gums sticking to and retiring with the feed-bar. Fig. 20 is a horizontal section, taken on line 20—20 of Fig. 3, illustrating devices for folding the end flaps of the packages. Fig. 21 is a horizontal section, taken in the same plane, showing the end folding devices in changed positions. Fig. 22 is a horizontal section, taken on line 22—22 of Fig. 3. Fig. 23 is an enlarged fragmentary side view of one of the crimping knives for crimping the bases of the end folds of the wrapper and the parts operatively associated therewith. Fig. 24 illustrates the gum with the inner wrapper partially wrapped therearound. Fig. 25 illustrates the gum with the outer wrapper partially inclosing the same and the inner wrapper. Fig. 26 illustrates the gum wrapped in the position illustrated in the machine in Fig. 19. Fig. 27 illustrates the end folds of the wrapper in the position illustrated in the machine in Fig. 20. Fig. 28 illustrates the wrapper completely folded about the gum.

As shown in the drawings, A designates the upper end of the base or support of the machine, and $A^1$ the main frame. The said main frame is of such construction and contour as to properly support and provide bearings for the various operative parts of the machine, and need not be designated by further reference letters, with the exception of specially indicated parts thereof, as will hereinafter appear.

B designates a vertical chute in which the gums are placed in superposed order and from which they are fed to the wrapping mechanism. The chute is supported on a horizontal shelf or platform $a$ that extends laterally outwardly from the main frame. Said shelf is provided in its top with a groove $a^1$ that constitutes the feed slot through which the gums are delivered from the feed chute to the wrapping mechanism, and a portion of which constitutes the bottom of the feed chute. The top wall of the front part of the chute comprises a horizontal plate $a^2$ (Figs. 3, 17 and 18). D designates a horizontally reciprocating feed-bar which reciprocates through said feed slot and the lower end of the chute. Said feed-bar has a range of movement of a length to carry it from a point immediately in front of the chute B to the wrapping mechanism at the rear end of the machine. The feed bar is actuated by the following mechanism.

$D^1$, (Figs. 1, 2 and 3) designates a block attached to the front end of the feed bar. It is apertured to fit over and slide endwise upon a horizontal guide rod $D^2$ that is fixed at its front end in a bracket $a^3$ extending forwardly from the frame, and at its rear end to a standard $a^4$ that rises from the shelf $a$. $D^3$ designates a vertically swinging lever, that is fixed at its lower end to a rock-shaft $D^4$ mounted horizontally in the frame of the machine. Said lever $D^3$ is of a two-part construction, as herein shown, and is connected at its upper end by means of links $d$ $d$ with oppositely extending studs $d^1$ $d^1$ on said sliding block $D^1$. The rock-shaft $D^4$ is rocked from the main driving shaft of the machine through mechanism generally similar to that shown in my prior application; the driving gear embracing a pulley $E^1$ driven by a belt from the pulley of the main drive shaft (not shown), and mounted on a shaft $E^2$ which extends transversely across and is mounted in the machine frame $A^1$. The said pulley $E^1$ is connected by a link $E^3$ with an arm $d^2$ that is rigid with the rock-shaft $D^4$. With this construction it will be seen that the feed-bar is reciprocated rearwardly and forwardly once during each rotation of the pulley $E^1$. A plate $a^5$ supported on the bracket $a^3$ extends over said guide-rod $D^2$ and constitutes a platform on which the gums may be placed, preparatory to feeding them to the chute B.

The folding mechanism for folding wrappers of appropriate size about the gum and the means for delivering the gums and wrappers to the folding mechanism will now be described. In the immediately following description, reference will first be made to the mechanism which folds the outer wrapper about the gum, leaving for subsequent consideration the mechanism for folding the inner or wax paper wrapper about the gum. In some instances the inner wrapper may be omitted and the mechanism now to be described, or its equivalent, will be all that is required to completely wrap the gum.

G designates, as a whole, a horizontal magazine, disposed longitudinally of the machine, for containing the outer wrappers, designated by X, cut to appropriate dimensions. Said magazine is located with its front end over the rear end of the feed slot $a^1$ and is substantially like that shown in the construction described in my prior application, it comprising the bottom and side walls and is open at its top. The magazine is designed to contain a closely compressed group or bundle of wrappers arranged at their edges and the wrappers are stripped or withdrawn one at a time from the inner end of the group. The compression of said wrappers is effected, as herein shown, between a weight controlled follower $G^1$ in the outer end of the magazine and the stripper roller I, as shown in Fig. 3, hereinafter to be described. Said follower is pressed upon the bundle of wrappers through the medium of a weight $G^2$ and a cable $g$ that is trained upwardly over a pulley $g^1$ fixed to the outer end of the magazine, forwardly over the pulley $g^2$ and thence backwardly for connection with the follower at $g^3$. The said magazine is mounted so that its inner end may be tilted upwardly away from the stripper roller to afford access to the inner end of the magazine and to the adjacent stripper roller. For this purpose, the bottom wall of the magazine is provided with downwardly projecting lugs $g^4$ $g^4$ that are pivoted to the adjacent frame by means of a pivot bolt or stud $g^5$.

Formed between a depending flange $A^3$ on the rearward end of the shelf or bracket $a$ and the vertical face of a generally triangular block H located beneath the magazine, (Figs. 3 and 18), is a vertical recess $A^4$ that is disposed at right angles to the feed slot $a^r$ and receives the wrappers from the magazine G as they are stripped from the magazine by the stripper roller I, and holds them severally in the path of the gums. The wrappers X are arrested in said recess by stops $h^1$ extending across the lower end of the recess, the upper part of a wrapper thus arrested extending into the path of a gum that is forced through the feed slot $a^1$.

The stripper roller I is fixed to the horizontal rotative shaft $E^2$ carrying the pulley $E^1$ before referred to. The said roller is of composite construction as will be more clearly seen by reference to Figs. 4, 15, 16 and 18 and constitutes one of the features of the present invention. The roller comprises a generally cylindric shell $I^1$ which is hollow and is provided with a longitudinal opening at one side. The greater portion of the bearing surface of the roller consists of the cylindric smooth face of the shell, it preferably being made of steel, and highly polished. The remaining portion of the bearing surface of the roller consists of a yielding friction surface which serves, upon engagement with the innermost wrapper, to strip or withdraw the same from the group and deposit it in the recess $A^4$. The construction by which such friction surface is provided is made as follows: The said frictional surface of the roller comprises alternate friction disks $i\ i$ and metal disks $i^1$. Said disks are contained within the hollow shell $I^1$ and are apertured to fit over the shaft $E^2$. The friction disks $i$ are disposed in pairs between each two adjacent metal disks. The disks are provided with eccentric portions $i^2\ i^3$, respectively, having curved peripheries concentric with the axis of the shaft $E^2$, the several disks thus constituting a continuation of the cylindric metal face of the roller. The eccentric portions $i^2$ of the friction members are shown as provided with lateral offset portions or extensions $i^4\ i^4$ (Fig. 15), and the projection $i^4$ of each disk is made of a thickness equal to the marginal thickness of the eccentric portion of its companion disk, and overlaps the periphery of the smaller diameter of its companion disk. It will thus be seen that the projection $i^4$ of each disk of a pair is in the plane of the main eccentric portion $i^2$ of the other disk. The purpose of this arrangement will be understood from a consideration of the following: The advance ends of the eccentric parts of the friction disks, relative to the direction of rotation thereof, are subject to wear inasmuch as they are first to strike the wrappers when rotating downwardly against the same. Such wearing of the advance ends brings the same radially inside the general circumference of the roller so that the stripping action of the roller is delayed by reason of the friction surface not taking hold of the wrapper in a manner to strip the same off the bundle at the instant the advance part of the friction surface of the roller is brought to tangential relation with the wrapper. When such wear occurs, the disks may be removed and the advance ends of the eccentric portions cut away, and when replaced the disks are angularly adjusted to separate the projections $i^4$ from the adjacent plain ends of said eccentric portions a distance equal to the length of the portion so cut away. The overlapping arrangement of the extension of each disk with the eccentric portion of its companion disk permits of such adjustment without breaking the continuity of the curved friction surface.

The shell $I^1$ is open at one end and is provided at its other end with a hub $I^2$ that is fixed to the shaft $E^2$ in any suitable manner (as by means of a transverse pin $i^5$ shown in Fig. 4). Said alternate pairs of friction and metal disks are clamped between the hub $I^2$ and a washer or follower $I^3$ fitting over the shaft and bearing against the outer disk of the series. The parts are pressed and held together by means of a nut $i^6$ engaging the outer end of the screw-threaded shaft $E^2$. The eccentric portions of the separating disks $i^1$ are slightly narrower than those of the friction disks $i$ thereby leaving grooves between the adjacent pairs, as shown in Fig. 4; and the shell $I^1$ is grooved in a similar manner to produce continuity of the grooves surrounding the roller. The said stripper roller rotates continuously. When the metal portion of the roller engages with the innermost wrapper, the friction between the same and the wrapper is not sufficient to remove the wrapper from the bundle, but said wrapper is stripped during the time the friction segment of the roller, constituted by the eccentric portion $i^2$ of the friction disks, is passed in contact with the innermost wrapper of the group. The friction disks are preferably made of rubber but may be made of any material having a smooth friction surface.

Extending downwardly through certain of the grooves of the roller, between the roller and magazine, are guide-rods $I^5$, suspended from an overhanging frame $G^5$ provided for a purpose hereinafter to be described. Said guide rods extend almost to the feed slot in a manner more clearly indicated in Fig. 3, to prevent the wrappers sticking to the face of the roller, thereby insuring the proper guidance of the said wrappers into the space $A^4$.

In order to prevent more than one wrapper being stripped from the bundle of wrappers at one time, I provide a mechanism which will next be described and which is mounted principally on the overhanging frame $G^5$ hereinabove referred to. The said mechanism comprises, as shown more clearly in Figs. 2, 3, 9, and 18, a rotating needle $G^6$ that extends horizontally toward the inner end of the group of wrappers and is fixed to the rearward end of a longitudinally extending shaft $g^7$ that is rotatively mounted in the frame $G^5$ above referred to. The said shaft $g^7$ is rotated from a circular rack or gear $i^7$ on the hub of the shell of the strip roller through the medium of a gear pinion $g^8$ (Fig. 9), fixed to one end of a transverse shaft $g^9$ mounted in the frame $G^5$ that is connected by beveled gears with the shaft $g^7$ (Figs. 2 and 3), and a rotative gear wheel $g^{10}$ which meshes with said pinion $g^8$ and gear-wheels $i^7$. Said intermediate gear-wheel $g^{10}$ is mounted on a stud $g^{11}$ that is carried by a swinging arm $g^{12}$ which swings about the shaft $g^9$ of the gear pinion $g^8$. The said arm is secured at its end remote from its hinge connection, to the frame of the magazine by means permitting the arm and the gear-wheel carried thereby to yield. This construction is provided to enable the gear-wheels $g^{10}$ and $i^7$ to be brought into mesh when the inner end of the magazine is swung downwardly into position without danger of injuring the teeth of said gears. The adjustment described consists in providing the inner or free end of the arm $g^{12}$ with a vertical opening through which extends a headed pin $g^{13}$ which extends also through a lug $g^{14}$ on the adjacent side face of the magazine. A spiral spring $g^{15}$ surrounding the pin and interposed between the arm and the head of the pin permits the arm and wheel $g^{10}$ to yield when said wheel is brought into mesh with the gears $i^7$. A nut $g^{16}$ threaded to the lower end of the pin is provided to hold the spring against the arm and vary the tension thereof.

The mechanism described operates to constantly rotate the needle $G^6$. The prime purpose of said needle is to prevent more than one wrapper at a time being stripped off the bundle in the magazine, said needle affording such resistance to the removal of a second or third wrapper as not to be overcome by the friction of the wrapper being withdrawn upon the next wrapper to be withdrawn. The rotative or other movement of the needle about its axis prevents particles of paper torn from the wrapper, when the wrapper is stripped from the needle, clinging to the needle and tending to clog the same, as would occur if the needle be stationary; thereby offering such resistance to the stripping of the wrapper as would result in tearing away of a material part of the upper ends of the wrappers or offering such resistance as to prevent the wrappers being timely stripped from the bundle.

In Fig. 3ᵃ I have shown a mechanism wherein the needle $G^6$ is given a rotary reciprocatory motion instead of a continuous rotary motion. This may be effected by a rack-and-gear mechanism comprising a gear $g^{17}$ on the end of the shaft $g^7$ and a rack $g^{18}$ engaging the same and adapted to be reciprocated in any suitable manner from an adjacent moving part of the machine. A gyrating motion of the needle about its point will produce the same result.

The construction of the folding mechanism and the operation thereof, whereby the folding of the wrappers about the gums after they leave the feed chute is effected, will now be described.

Formed between the upper flat faces of the block H and the bottom wall of the magazine is a folding slot $h^3$ located in line with a feed slot $a^1$ (Figs. 3, 18 and 19). The top wall of said slot $h^3$ is provided at its side with depending flanges $h^4$ constituting the side walls of the said slot, said flanges terminating above the bottom wall of the slot so as to form longitudinal openings in the sides thereof through which the end folds of the wrapper, after the side folds have been formed, are adapted to extend while the gum is in said folding slot. If it be assumed that a wrapper X is supported within the recess $A^4$ and in the path of movement of the feed bars D and the gum advanced thereby, as indicated in Fig. 18, the first operation of folding the wrapper about the gum is as follows: The continued advance movement of the gum, actuated by the feed-bar, from the position shown in Fig. 18, acts to bring the forward edge of the gum against the wrapper and to fold said wrapper at its line of contact about the advance side of the gum, the wrapper being thereafter carried with the gum into the folding slot $h^3$, as shown in Fig. 3, to form the first side fold as indicated in Fig. 25. The continued advance movement of the feed-bar forces the advance margin of the partially wrapped gum between upper and lower gripping jaws $j$ $j^1$ carried by the upper end of a vertically swinging arm J (Figs. 3 and 19). Said arm is fixed to a hroizontal rock-shaft $J^1$ that extends transversely across and has bearing in the frame of the machine. In the present instance the upper jaw $j$ is made a fixed part of the lever, while the lower jaw swings toward and from the fixed jaw. The folding arm stands normally in a vertical position (as shown in Figs. 1 and 3) and when in this position the space between the jaws is in line with the said folding slot so that in the last movement of the feed-bar C the partially wrapped gum is delivered between said jaws. In the present instance the lever J is forked at its upper end and is provided with a transverse connecting portion $j^2$ at the top to which the upper fixed jaw is detachably affixed by means of screws or the like. The lower jaw extends rearwardly between the members of the forked upper end of the arm J and is pivotally connected to said arm in rear thereof by means of a pin $j^3$. Said swinging jaw is held with its gripping end normally in its uppermost position through the medium of a spiral contractile spring $j^4$ that is fixed at its lower end to a stud $j^5$ on the arm, and its upper end to a rearwardly and downwardly directed tailpiece $j^6$ of the swinging jaw. Said spring $j^4$ is made of such strength as to lightly grip the gum between the upper and lower jaws in the subsequent operation of this portion of the device.

After the gum has been delivered to the jaws as described the feed-bar is quickly retracted by its operating mechanism hereinbefore described. It is desirable, when operating in damp weather or with fresh gum, that means be provided to prevent the gum sticking to the advance end of the feed-bar and being thereby retracted when the feed-bar is retired. This may be accomplished by means of a detent or dog $J^2$, (Figs. 3 and 19) that is pivoted in a suitable recess in the bottom wall of the magazine by means of a stud $j^{16}$. Said dog extends downwardly and rearwardly from its pivot through the feed slot into a notch $d^5$ in the advance end of the bar, shown in Fig. 10 in position to engage the rear margin of a partially wrapped gum delivered to the jaws $j\ j^1$. It is held in its normally lowermost position by means of a spiral, expansively acting spring $j^{17}$ interposed between the tail of the dog and an opposing part of the bottom wall of the magazine. Said dog is held by the spring $j^{17}$ against a shoulder $j^{18}$ in the bottom wall of the magazine which limits the downward movement thereof. When the feed-bar is in its rearmost position the lower end of the dog enters the notch $d^5$ of the feed-bar so as to engage the rear end of the gum, and when the feed-bar is withdrawn, the dog holds the gum in place.

After the feed-bar is retracted, the free or unfolded side margin of the wrapper lies flat upon the block H in the position in which it is shown in Fig. 25. The next operation of the wrapping mechanism consists in swinging the folding arm J forwardly and downwardly in the general manner shown in Fig. 19. During the downward swing of the lever, the free or unfolded side of the wrapper is folded upwardly about the adjacent side margin of the gum as the gum passes the upper point $h^6$ of the folding block H, the notch $g^{19}$ affording space for the side of the wrapper to be swung upwardly into its folded position. Said folding block is formed with a rearwardly facing curved folding surface $h^7$ concentric with the axis of oscillation of the arm J, which serves to hold the last folded side of the wrapper in place during the downward swing of the arm.

The means for rocking the shaft $J^1$ to swing the lever forwardly and downwardly comprises a link or connecting rod $J^3$ (Fig. 2) connected at its rear end with a forked arm $J^4$ rigid with the rock-shaft, and connected at its front end with a stud $J^5$ which is rotatively mounted in an arm $d^6$ rigid with the rock-shaft $D^4$. The said connections are so timed, relatively to the movement of the rock-shaft, as to impart during each rocking movement of the shaft $D^4$ a rapid to-and-fro rocking movement of the shaft $J^1$ to effect a rapid swinging of the arm J downwardly and its return to its normal or uppermost position.

The folding arm J delivers the gums with the two sides of the wrapper folded thereon into a slot K (Fig. 3) located directly below the lower end of a curved face $h^7$ of the block H. Said slot K is formed between a vertical plate $K^1$ and its lip $k$ and two vertical inwardly extending flanges $k^1\ k^1$ of horizontal, separable arms $K^2\ K^2$ mounted on studs $k^3$ $k^3$ suitably fixed to a lateral horizontal extension $A^8$ of the machine frame as shown in Fig. 5. The plate $K^1$ is affixed to and depends from the flange $A^3$ constituting one wall of the wrapper receiving slot $A^4$. Said arms $K^2$ are placed under the influence of volute springs $k^4$ surrounding the studs $k^3$ on which they are mounted, each attached at one end to the frame and at its other end to its arm as shown in Fig. 5. The plate $K^1$ constitutes the front wall of the folding slot, and the flanges $k^1\ k^1$ the rear wall thereof. The said rear wall of the slot is thus made of two laterally separable parts to permit the same to be pulled away from each other to open the slot in the event of the slot becoming clogged. The said flanges $k^1$ constituting the rear walls of the lower folding slot are provided with upwardly extending arms $k^2$ between which and the front wall of the slot the gums are held during the time when the initial folding of the end folds of the wrappers takes place.

The swinging jaw $j^1$ of the folding arm J is opened when it reaches the limit of its downward movement to bring the gum into the open or entering end of the slot K, between said arms $k^2$ and wall $K^1$, by means of a stationary cam $j^{10}$ formed on the upper end of a standard $J^7$ rising from the frame of the machine, (Figs. 1 and 3) said cam being engaged by an antifriction roller $j^{11}$ carried by the lower end of the tail-piece $j^6$ of said swinging jaw. When the folding arm rises and the roller of the tail-piece moves out of contact with said cam, the spring $j^4$ restores the swinging jaw to its normal position. As each gum, thus partially wrapped, is deposited in the upper end of the lower folding slot K, the bases of the end folds of the wrappers are creased by creasing plates $K^4\ K^4$ (Figs. 1, 3, 4, 8, 20, 21 and 23) which are disposed vertically one at each side or edge of the lower folding slot. The creasing plates are pivotally mounted on horizontal pivot studs $k^6$ that are attached to and extend laterally from the side edges of the front wall $K^1$ of said slot. The said creasing plates are sharpened at their forward edges and said forward edges are adapted to be normally extended beyond said wall $K^1$ partially across the sides of the lower folding slot. The plates are held in this position by means of volute springs $k^7$ surrounding said studs and attached at their ends to said studs and to the plates $K^4$, respectively. The upper parts of the sharpened margins of said creaser plates are curved so that, while normally said creaser plates extend across the slots, the yielding mounting thereof permits the plates to yield backwardly when a gum is inserted into the lower slot. Said springs press the creaser plates forwardly with sufficient firmness to produce permanent creases at the bases of the end folds, thereby producing a smooth end fold.

After the gum has been inserted into the entering end of the lower folding slot and has been creased in the manner described, the said end folds assume the positions shown in Fig. 20. Thereafter folding fingers $K^5$ $K^5$, located in advance and one at each side of said slot, are moved forwardly to bend said end folds at right angles to the body of the package and flat against the creaser plates $K^4$. Said folding fingers $K^5$ are herein shown as mounted on the lower end of a two-part arm, the members $k^8$ $k^8$ of which are fixed to a rock-shaft $K^6$ (Figs. 2 and 3) which is mounted horizontally in the machine frame parallel with the shaft $E^2$ and in rear of the same. The rock-shaft carries at its end remote from the arms $k^8$ a rigid cross-arm $k^9$ to one end of which is attached a spiral contractile spring $K^7$, (Figs. 2 and 4) said spring being attached at its lower end to the machine frame. The spring $K^7$ operates to throw the folding fingers rearwardly to engage and fold inwardly the end folds of the wrappers. Said folding fingers are normally held in their retracted positions through the action of a cam $E^5$ on the counter-shaft $E^2$ engaging a bearing roller $k^{10}$ on the end of the arm remote from the spring $K^7$. Once during each rotation of the shaft $E^2$, therefore, the said folding fingers are advanced to perform the function described, and are thereafter retired.

The folding fingers $K^5$ are mounted on the lower end of the two-part arm thereof in a manner to swing or yield laterally outwardly, in order to avoid stress being thrown on said parts by reason of clogging due to broken or imperfectly wrapped gums. The means whereby said fingers are yieldingly mounted on said arm is more clearly shown in Fig. 21 and is made as follows: The said fingers are connected with the lower ends of said arm members by hinged pieces $k^{20}$ $k^{20}$ that are riveted or otherwise fastened to the forward ends of said fingers. Said hinged pieces are hinged to inwardly extending lugs $k^{21}$ $k^{21}$ of said arm members, by hinged pins $k^{22}$. Said hinged pieces are provided with tail-pieces $k^{23}$ $k^{23}$ which extend laterally outwardly and inwardly, and said tail-pieces are connected by means of spiral, contractile springs $k^{24}$ with lugs $k^{25}$ carried by the arm members, the springs acting to normally hold the fingers pressed inwardly toward each other, but permitting them to yield outwardly under the stress referred to. Fingers $K^8$ for retaining the end folds in their right-angle positions to which they are brought by the folding fingers $K^5$, are employed. Said retaining fingers are mounted to swing in the same plane as the fingers $K^5$, and are so constructed and arranged that when the folding fingers reach the forward limit of their movement, as shown in Fig. 21, they almost engage the rear ends of the retaining fingers. When said folding fingers retire, the retaining fingers move rearwardly to hold the end folds in their right angle positions. The said folding fingers $K^8$ are mounted on the lower end of a two-part arm, the members $k^{11}$ $k^{11}$ of which are fixed at their upper ends to a horizontal rock-shaft $K^9$ parallel with and located in front of the rock-shaft $K^6$. The said rock-shaft $K^9$ is provided at its end remote from the retaining fingers with a cross-arm $k^{12}$, (Figs. 2 and 4) to one end of which the upper end of a spiral contractile spring $K^{10}$ is attached, the lower end of the spring being fixed to the frame. The said spring acts to swing said retaining fingers forwardly to engage the right angle folds of the wrapper, in the manner described. The cross-arm $k^{12}$ is rocked to retract the retaining fingers $K^8$ and hold them in their retracted position through the medium of a cam $E^6$ fixed on the shaft $E^2$ at the side of the cam $E^5$ and adapted to engage a bearing roller $k^{13}$ on the end of the arm $k^{12}$ remote from the spring $K^{10}$. Conveniently, the creaser-plates $K^4$ are operatively connected with the members $k^{11}$ of the swinging arm of said retaining fingers, in such manner that when the retaining fingers are swung rearwardly and follow the retiring folding fingers $K^5$, the creaser-plates are retracted against the action of their springs $k^7$. This result is accomplished by providing the said creaser-plates with tail-pieces $k^{14}$ $k^{14}$ having their lower margins, adjacent to the plates, inclined as shown at $k^{15}$. Said tail-pieces are designed for engagement with rollers $k^{16}$ $k^{16}$ carried by the members $k^{11}$ of the retaining plate arm, as clearly shown in Figs. 1, 3 and 4. The inclined margins $k^{15}$ of said tail-pieces are so disposed that when the retaining plate carrying arm moves forwardly the rollers act upon said inclined margins to retract the lower ends of the plates from the slots. This construction is provided in order that each gum may be forced downwardly to the bottom of the folding slot, where the final folding operation takes place, without being impeded by friction between said creaser-plates and the wrappers. In this type of machine, the gums are forced from the entering end of the folding slot to the lower end thereof by pressure applied through the gums delivered to the upper end of the slot by the folding arm J. At the same time a completely wrapped gum is discharged by the same pressure from the lower end of the slot. Thus one completely wrapped gum is discharged from the lower end of the folding slot at each time a partially wrapped gum is delivered to the upper end of said slot, whereby said gums are moved through and discharged from said slot through the medium of the folding arm J and the successively lower gums.

Referring now to the mechanism for completing the end folds of the wrapper, that is to say, for turning the creased right-angled folds from the positions shown in Figs. 21 and 27 to that shown in Figs. 22 and 28, said mechanism is made as follows: L L (Figs. 1, 3 and 5) designate horizontally swinging folding arms which are mounted on studs $l\ l$ extending upwardly from the frame extension $A^8$ and extend at their free ends, one at each side of the lower folding slot. Volute springs $l^1\ l^1$ surrounding the bearing hubs or sleeves of said arms serve, when the arms are unrestrained to swing the arms toward each other. Said arms are provided on their free ends with inwardly directed folding fingers $l^2\ l^2$, (Figs. 4, 5 and 22) located below the level of the preliminary folding fingers $K^5$, and are moved inwardly, when the arms swing toward each other, to engage the right angle folds of the wrapper to fold them flat upon the package, thus completing the package as it is seen in Fig. 28. Said end folds are folded outside of and flat upon the thin extension $k$ of the plate $K^1$ that forms the lower part of one wall of the folding slot as stated. The full lines in Fig. 22 indicate the said folding arms in their innermost or folding positions, and in dotted lines in their retracted positions. Said lower folding arms are held in their retracted positions by pivotally acting means while the springs $l^1$ swing them into their operative folding positions. Said positively acting means consists, as herein shown, of a vertically oscillatory cam $J^{10}$ located above and between the arms and fixed to the folding lever J. Said cam $J^{10}$ is made thin at one end and is gradually thickened at both sides toward its other end. The folding arms are provided with vertical roller bearing studs $l^3\ l^3$ between their pivoted ends and the folding fingers, and said cam is adapted to occupy the space between said studs, whereby the latter are engaged by said oppositely facing cam surfaces. The arms are, therefore, spread apart when the thickened portion of the cam is brought between said studs. The latter positions are the normal or inoperative positions of the parts. When the folding lever is swung downwardly to deliver a gum to the folding slot, the thinner part of the cam engaged with said studs and the free end of the arms and folding fingers are swung inwardly by their springs $l^1$ in a position to finish the end folding of the wrappers. Said studs $l$ are provided with bearing rollers for engagement with the cams $J^{10}$.

The machine, as thus far described, is completely operative for wrapping single wrappers about gums and discharging the same individually from the machine. The machine is so timed that when one gum is contained in one end of the lower folding slot and the end folding being completed by the folding fingers $l^2$ another gum is contained in the upper part of the slot in position for the fingers $K^5$ to act on the end folds of the wrapper thereof before the retraction of the folding fingers $K^5$, the retaining fingers advance to retain the end folds in their right-angle positions. Immediately thereafter the folding arm J is swung downwardly to deliver another gum to the upper part of the slot. In so delivering another partially wrapped gum to the upper part of the slot, the entering partially wrapped gum forcing the completely wrapped gum out of the slot and forcing the gum theretofore in the upper end of the slot to the lower end thereof in position for its wrapper to be completely folded.

It is desirable that means be provided for holding the end folds flat upon the wrapped gum when the latter is discharged from the folding slot, especially when the wrapped gums are delivered from said slot to a narrow slot or passage of another part of the mechanism as is true here. This is accomplished in the present instance by means of a downwardly depending flange $k^{26}$ which is formed on a plate $k^{27}$ (Figs. 1, 3 and 21) carried by the lower end of the two-part arm of the folding retaining finger. Said plate and its flange are located between the lower edges of the retaining fingers. Therefore, when said fingers advance for retaining the end folds of the partially folded wrapper in the upper part of the slot, the flange $k^{26}$ is in position to engage the completed folds of the package in the lower end of the slot during the time it is being discharged from the slot.

In order that the vertical margins of the folded package may be rounded or finished before the package is discharged from the slot, the side edges of the flanges $k^1$ constituting one wall of the slot, are formed to provide hooked shaped extensions $k^{28}$ which are rounded on their inner surfaces and embrace the vertical margins of the packages, as shown more clearly in Fig. 22. The forcing of said margins past and against said inner concavely rounded surfaces of the extension imparts a smooth or rounded finish to the margins of the packages.

In the practical operation of a device of this character, it is desirable that the gums, after being wrapped, shall be assembled in the machine in groups of a predetermined number of gums, such number depending upon the commercial convenience of handling the gums. As herein shown, five gums constitute such a group. It is also desirable that the gums of each group shall be so arranged that the plain faces of the wrappers of the two outside gums face outwardly. In order to effect this latter result it is necessary to turn or reverse end to end, one gum of each group after it is discharged from the folding mechanism and before it is assembled. The turning operation is shown as effected by means of a suitable turn-table mechanism having a slot through which the wrapped gums are directed from the lower end-folding slot, and before they are grouped or assembled. Said slot of the turn-table retains each gum during the time required for one operation of the folding mechanism and is shifted at proper times a half rotation to reverse the gum. Mechanism herein shown for thus reversing one of the gums of each group is made as follows, (Figs. 1, 3, 4, 6 and 8). M designates the turn-table referred to, which is located immediately beneath the folding slot K, and is provided with a slot $m$ located in line with and constituting an extension of the slot K. Said turn-table has rotative bearing in an overhanging extension or bracket $A^{15}$ of the frame. Beneath and at one side of said slot is located an assembling chamber P disposed in line with a discharge chute $P^1$. Immediately beneath the slot of the turn-table is located a receiving chamber $P^2$ which communicates laterally with the assembling chamber through an opening $p$. The said discharge chute $P^1$ is supported at its inner end on a laterally extending bracket $A^{20}$ (Figs. 4 and 7) fixed to the frame. Said turn-table is rotated through a half-turn at appropriate times in the operation of the machine, to reverse the gums end to end, through the medium of a horizontal rack-bar N (Figs. 3, 5 and 6) which has suitable guiding engagement in the frame $A^1$ and engages cogs or teeth $m^1$ on the periphery of the upper end of the turn-table. A plate $m^2$ is applied over the top of the turn-table, as shown in Fig. 8, in overlapping engagement with the flange on which the teeth are formed in order to hold the turn-table in its bearing socket; and said plate extends outwardly over the rack-bar N to hold the same from rising. The means for reciprocating said rack bar is made as follows: O (Figs. 1, 2 and 4) designates a cam-wheel mounted on the horizontal rock-shaft $J^1$, and is provided with peripheral cam tracks or grooves $o$ $o^1$, and with a circular series of gear-teeth $o^2$. Said wheel is rotated by intermeshing engagement of said gear teeth $o^2$ with a pinion $E^{15}$ fixed to the rotary shaft $E^2$. The said cam track or groove $o$ is engaged by a cam stud $n$ (Figs. 4 and 5) which rises from a rigid arm $n^1$ of a horizontally swinging lever $N^1$ that is pivoted at one end to a standard or post $n^2$ and extends transversely across the machine and is connected by a pin and slot connection at its other end with the rack-bar N. The cam slot $o$ is so formed that the rack-bar is shifted endwise and the turn-table rotated through a half-turn once during the period required to deliver the number of gums constituting each group to effect the endwise reversal of one of said gums.

In order to insure that the turn-table shall always stop with a slot $m$ in alinement with the lower end of the folding slot K, notwithstanding slight wear of the operating parts, a horizontally movable, spring-pressed arm $M^1$ is provided that is pivoted at $m^3$ (Figs. 3, 4 and 6) to the overhanging extension $A^{15}$ which supports said turn-table and is designed to bear at its other end against two oppositely located flat surfaces $m^{20}$ of the turn-table in the manner indicated in Figs. 3 and 6. Said arm is herein shown as made rigid, and a spring $M^2$ is applied to hold the free end thereof engaged with the flattened surfaces of the turn-table. Said spring has the form of a spiral, expansively acting spring which surrounds a headed bolt or pin $M^3$ that extends through an opening in said arm and into the bracket $A^{15}$, the spring being interposed between said arm and the head of the pin.

In order to prevent the gums from passing too freely through the slot of the turn-table, said slot is shown as provided at its ends with yielding bars $M^5$, each of which is pivoted at its upper end on a pivot pin $m^4$ extending transversely across the slot. Said bars are inclined downwardly and toward each other at the lower ends, said lower ends being pressed toward each other by backing springs $m^5$ (Fig. 8). When, therefore, a gum is forced downwardly into said slot $m$, the spring-pressed bars yieldingly hold said gums therein until it is positively forced out of the slot into the receiving chamber $P^2$ by the next succeeding gum. The inner faces of said bars $M^5$ are transversely concave, and serve to give a final finish to the margins of the gums as they are forced between the same.

The gums are delivered from the receiving chamber $P^2$ to the assembling chamber $P^1$ through the medium of a longitudinally reciprocating plunger Q that is operated from the rock shaft $D^4$ and is provided at its forward end with a suitably shaped head $Q^1$, as shown more clearly in Figs. 7 and 8 that is adapted to pass through said receiving chamber and force the gums one at a time as they are discharged from the folding slot into the assembling chamber. Said head of the plunger has guiding engagement with vertical flanges $p^1$ $p^1$ rising upwardly from the bracket $A^{20}$. The operative connection between the plunger Q and the rock-shaft $P^4$ to effect the short reciprocation of the plunger required to shift the gums one by one from the receiving to the assembling chamber is made as follows: The rock shaft $D^4$ extends through a slot in the rear end of the plunger Q (Fig. 3) and the rock-shaft is provided with a crank-arm $d^{10}$ provided with a crank pin $d^{11}$ that engages an upwardly opening notch in the upper margin of said plunger. The arc of movement of the pin $d^{11}$ is short thereby imparting a short longitudinal reciprocation to the plunger Q.

In order to maintain the gums in an upright position on their edges, as shown in Fig. 7, during the assembling of a group of gums in the chamber P, the gums are pressed against a yielding abutment on the side of the assembling chamber remote from the opening $p$, consisting in this instance of a horizontally yielding rod $P^3$. Said yielding rod is spring pressed to hold its free end closely adjacent to the communicating opening $p$ when unrestrained. When a gum is shifted by the plunger Q into the receiving chamber, therefore, it is at once engaged by the rod $P^3$ and is held upright between the rod and plunger while being shifted into the assembling chamber. The yieldable rod follows the plunger, when the latter retires, to force the group of gums against a solid abutment or retaining device which is arranged to swing upwardly between the receiving and assembling chambers before the retraction of the plunger from the assembling chamber, as will hereinafter appear. The yieldable rod is mounted in apertured upright lugs rising from a bracket $A^{21}$ extending rearwardly from the bracket $A^{20}$, as more clearly shown in Fig. 3. It is provided at its outer end with a receiving down-turned portion $p^3$. A spiral contractile spring $p^4$ is attached at one end to said down-turned portion of the rod and at its other end to a set screw $p^5$ secured to the bracket $A^{21}$. Said spring is light and forces the rod $P^3$ inwardly with but little pressure.

The means referred to for preventing the gums being returned to the receiving chamber through the action of the yieldable rod $P^3$ after the plunger Q has been retired from the assembling chamber is made as follows: $P^4$ designates a vertically swinging arm located beneath the bracket $A^{20}$ (Figs. 1, 3 and 8). Said arm is provided at one end with a plurality of fingers $p^6$, three in number as herein shown, which are adapted, when the arm is swung upwardly, to extend upward through slots in the bottom wall of the receiving chamber to constitute a partition between the receiving and assembling chambers. The head of the plunger is forked and made narrower than the receiving chamber so as not to interfere with the movement of said fingers (Figs. 7 and 8). Said arm $P^4$ is mounted to swing about a horizontal axis located between the ends of the plunger Q and is herein shown as operatively connected with the plunger in such manner as to swing said fingers upwardly into place just before the plunger retires from the assembling chamber, and to swing said fingers downwardly when the plunger advances to force another gum from the receiving chamber to the assembling chamber. The devices for effecting this result are made as follows, (Fig. 3).

$P^5$ designates a rocker to the lower end of which the bar $P^4$ is attached. Said rocker swings on a stud $p^8$ that extends laterally from a bearing $p^9$ rising from and supported on the bracket $A^{20}$ (Figs. 8 and 8ᵃ). The plunger is located between the bearing and the hub of the rocker and is provided with a longitudinal slot $q^1$ through which the stud $p^8$ extends; said slot permitting the endwise movement of the plunger relatively to the stud a distance equal to or slightly less than the length of the slot. The arm and fingers are held in their normal uppermost positions against a stop $p^{10}$ (Fig. 3) by means of a volute spring $p^{11}$ surrounding the hub of said rocker and attached at one end to the rocker and at its other end to a disk $p^{12}$ fixed to the outer end of said stud. The construction for swinging the fingers downwardly as the plunger approaches the limit of its advance movement is made as follows: The said plunger is provided at its top margin with a thickened lug $q^2$ that rises above the same. To the upper end of the lug is hinged by a pin $q^4$ a vertically swinging detent $q^3$. The said lug is cut away or recessed and the detent occupies such cut away portion. The cutting away of said lug in the manner described provides a vertical shoulder $q^5$ against which one vertical margin of the detent contacts. The detent may, therefore, swing freely in one direction, to wit, away from the shoulder, but the shoulder serves as a stop to prevent the detent from swinging in the other direction. The lower end margin of said detent is formed to provide oppositely inclined surfaces $q^6$ $q^7$, the former adapted to engage a correspondingly inclined surface $p^{14}$ on the upper end of the rocker $P^5$, and the latter adapted to engage an opposing inclined surface $p^{15}$ on said block, in the manner shown in Figs. 3 and 8ᵇ.

The operation of the mechanism is as follows: When the plunger is in its forwardmost position, as indicated in Fig. 3, and has just shifted one of the gums from the receiving to the assembling chamber, the inclined margin $q^7$ of the detent engages the inclined margin $p^{14}$ of the rocker $P^5$. At this time the holding fingers $p^6$ are in their uppermost position so as to coöperate with the yieldable rod $P^3$ to hold the gums upright when the plunger Q is retired. During the retiring movement of the plunger Q the swinging detent rides freely over the point of said rocker between the two opposing inclined surfaces $p^{14}$ $p^{15}$ thereof, so that no movement of the arm $P^4$ and fingers $p^6$ occur. However, when the plunger again advances, after another gum has dropped into the receiving chamber to force the latter into the assembling chamber, the inclined surface $q^6$ of the detent strikes the inclined surface $p^{15}$ of the rocker $P^5$ and, inasmuch as the shoulder $q^5$ on the lug $q^2$ prevents the detent from swinging at this time, the engaging inclined surfaces in contact serve to swing or oscillate the block $P^5$ and thereby swing the arm $P^4$ and the holding fingers $P^6$ downwardly out of the path of the gum on its way from the receiving to the assembling chamber. Before the plunger has completed its inward stroke, and after the detent has passed the highest point of the rocker $P^5$, the said fingers $p^6$ are returned to their uppermost or holding positions through the medium of the spring $p^{11}$, so that at the time the plunger begins to retire, the folding fingers are in position to hold the assembled or partially assembled group of gums in vertical position.

After a required number of gums have been delivered to the assembling chamber in the manner described to constitute a group or package, mechanism is set in operation for forcing the group a distance through the chute, toward the discharge end thereof, laterally out of the path of the next group to be assembled in the assembling chamber. The mechanism for effecting this result is shown in Figs. 5, 7 and 8 and is as follows: As therein shown, R designates a horizontal reciprocating ejector bar located in line with and reciprocating longitudinally of the discharge chute. Said ejector bar extends horizontally toward the machine frame and has guiding engagement at its rear end with guide lugs $r$ $r$ extending upwardly from the machine frame beneath the cam wheel O.
Loosely connected with said ejector bar between its ends is a horizontal rock arm $R^1$ that is hinged to a stud $r^2$ rising from the base of the machine frame $A^1$. Said rock arm is provided between its ends with a lug $r^2$ having a bearing roller thereon that is adapted to travel in the cam groove $o^1$ in cam wheel O. With this construction the ejector bar is moved outwardly during each engagement of the lug $r^1$ with the deflected portion of the cam groove or track $o^1$ of said cam wheel, to force a newly formed group of gums endwise of the chute just after the rack-bar N has been operated through the medium of the cam groove $o$ and the rock-arm $N^1$ to rotate the turn-table to turn the last gum of the group, said last gum having been transferred from the receiving chamber to the assembling chamber before the ejector bar operates. The forward end of the ejector bar is horizontally slitted or divided in order to pass over the rod $P^3$ when the bar is moved outwardly as shown in Fig. 8. Said forward end or head of the ejector bar is made of considerable width at its end, as indicated in Fig. 3, to afford a wide bearing thereof with the group of gums to be advanced thereby.

The discharge chute is provided with a yielding wall section $p^{20}$ (Fig. 7) on its side remote from the receiving chamber, and in advance thereof the opening in the wall which receives said section is provided with a vertically inclined margin $p^{21}$. The said yielding wall section is shown as formed on or constituting the inwardly turned head of a swinging arm $p^{22}$ hinged at $p^{23}$ to a bracket $p^{24}$ extending laterally from the chute. A volute spring $p^{25}$ presses the arm inwardly against a slot $p^{20}$ with the part $p^{20}$ in the position shown in said Fig. 7. The purpose of the construction last described is to eject a gum from the chute in the event the group should contain one too many gums. For instance, if one gum should stick in the assembling chamber at the time a group is advanced therethrough, said gum would be an excess gum of the next group. When such group is advanced, therefore, the excessive width of the group acts to force the wall section $p^{20}$ outwardly and the extra or outside gum strikes the inclined margin $p^{21}$ and is discharged from the chute, without in any manner disturbing the advancing group.

Referring now to the means for feeding the inner wrapper to the feed slot and applying it to the gum, said mechanism is shown most clearly in Figs. 1, 2, 3, 9, 10, 11, 12, 13 and 17, and is made as follows: S is a spindle or spool on which the paper is supported in a roll, the spool being mounted on the upper end of a standard $S^1$ (Fig. 1) rising from the machine frame. The strip of wax paper is fed from said roller through a vertical guide located just in rear of the gum chute B, between two horizontal feed rollers $T^1$ $T^2$ (Fig. 3) into a space $T^{30}$ located below the feed slot $a^1$ and designed to hold the several inner wrappers in the path of the gum. The said receiving space $T^{30}$ is formed between a downwardly projecting flange $a^{20}$ of the bracket $a$ and a stop or stops fastened to said flange and extending rearwardly and upwardly therefrom. The rollers are fixed to rotative shafts $t^1$ $t^2$, as shown in Figs. 3, 9 and 10. Suitable cutting mechanism is located between the rollers and stops $t$ to cut wrappers Y of the proper length from the strip, as will be hereinafter described. One of the rollers, the roller $T^2$ as herein shown, is roughened in order to insure the feed of the paper between the rollers. After said lower end of the strip is cut off to produce an individual wrapper, a gum is forced across said wrapper to fold the latter about one side of the gum in the same general manner as is the outer wrapper folded about the gum (Fig. 17). Said inner wrappers are narrower than the outer wrappers, as shown in Fig. 25.

The shaft $t^2$ is mounted in two vertical standards $T^3$ fixed to and extending above the machine frame, laterally inside the rollers (Figs. 2 and 10). The roller shaft $t^1$ is mounted in a swinging frame comprising an upper shaft $t^3$ extending through the upper ends of the standards $T^3$ and depending arms

$t^4$ $t^4$ mounted at their upper ends on the shaft $t^3$ and in the lower ends of which the shaft $t^1$ is rotatively mounted. The upper ends of the standards $T^3$ are curved rearwardly in order that the arms $t^4$ may hang parallel to said standards (Fig. 9). The said rollers are pressed yieldingly together by an adjustable pressing device comprising a pin $T^4$ extending through an apertured cross-bar $t^5$ connecting the standards $T^3$ and fixed at its rear end to a like cross-bar $t^6$ connecting the arms $t^4$, and a spiral spring $t^7$ surrounding the pin and interposed between the bar $t^5$ and a nut or disk $t^8$ adjustably fixed to the forward end of the spring. The mechanism for rotating said feed rollers is made as follows: U (Figs. 2, 10 and 14) designates a rock-shaft that extends horizontally across the machine frame and is mounted in bearings $a^{25}$ $a^{25}$ on said frame.
The said shaft is provided at one end with a gear pinion $u$ which meshes with a gear segment $U^1$ carried by an arm $U^2$ that extends beneath the shaft $E^2$ of the machine and is pivoted to the machine frame at its end remote from the segment by means of a pivot stud $u^1$. Said gear segment arm is swung on its axis to impart a complete rotation to the shaft U through the means of a cam $E^{20}$ fixed to the shaft $E^2$ and adapted to engage a roller bearing $u^3$ on said arm $U^2$ Fig. 4. Mounted on the end of the shaft U remote from the pinion $u$ is a second gear pinion $u^{30}$ that may rotate freely about the shaft but is adapted to be clutched thereto to rotate with the shaft in one direction. For this purpose the hub of said pinion $u^{30}$ and the adjacent end of a sleeve $u^4$, surrounding and having non-rotative but endwise movement with the shaft, are provided in their adjacent ends with clutch teeth which operate to turn the pinion in one direction, but said sleeve and the shaft rotate in the other direction without turning the pinion. Said sleeve $u^4$ has pin-and-slot connection with the shaft, as shown in Fig. 14, and is held against the clutch element of the hub of the pinion $u^{30}$ by means of a light spring $u^5$ interposed between said sleeve and a collar $u^6$ fastened to the shaft. The said gear pinion $u^{30}$ meshes with a gear wheel $U^4$ (Figs. 2, 9 and 10) rotating on a stud $u^7$ that is fixed in a bracket $a^{26}$ rising from the adjacent bearing $a^{25}$. The said gear wheel $U^4$ meshes with a gear pinion $t^{10}$ fixed to the adjacent roller shaft $t^3$, and said pinion $t^{10}$ intermeshes with a like pinion $t^{11}$ fixed to the other roller shaft $t^1$. A braking or retarding device is applied to the gear wheel $U^4$ to arrest the rotation of the shafts $t^1$ $t^2$ at the time the feed shaft U is arrested, and thereby preventing over-running of the feed-rollers. The brake or retarding device shown comprises a spiral, expansively acting spring $u^8$ surrounding the stud $u^7$ and interposed between the gear wheel $U^4$ and a collar $u^9$ fixed to the outer end of the stud $u^7$, as by means of a set screw $u^{10}$. The spring $u^8$ thus exerts a braking friction on the wheel $U^4$ and such friction may be varied by adjusting the collar $u^9$ on the stud $u^7$ towards and away from the gear wheel. After the shaft U has been rotated an angular distance sufficient to give the proper feed motion to the rollers $T^1$ $T^2$ to feed the paper the length of an inner wrapper Y, the said shaft and the gear segment $U^1$ are quickly retracted through the medium of a volute spring $U^5$ surrounding said shaft between the collar $u^6$ and the bearing $a^{25}$ adjacent to the pinion $u$, said spring being fastened at one end to said collar and its other end to an arm $a^{27}$ extending inwardly from said bearing $a^{25}$ (Fig. 14). During the restoring movement of the feed shaft U, the clutch sleeve $u^4$ yields backwardly so that the restoration of the feed shaft does not have the effect to produce a corresponding angular movement of said pinion $u^{30}$. Tendency of the pinion $u^{30}$ to turn backwardly is overcome by the brake-spring $u^8$ before described.

After the strip has been thus fed downwardly the proper distance between the feed rollers, cutting mechanism is set in motion to sever an inner wrapper from the lower end of the strip, the latter resting at this time against the stops $t$ of the wrapper receiving chamber $T^{30}$. The mechanism for so cutting the inner wrappers from the lower end of the strip of paper is made as follows: V (Figs. 1, 2, 10, 11, 12 and 17) designates a vertically rocking arm provided at its lower end with a hub $v$ that is fixed to a horizontal rock-shaft $V^1$ extending transversely and horizontally across the machine frame and mounted in suitable bearings therein. Said rocking arm V is provided at its upper end with a generally horizontal head $V^3$ which is formed with a central, horizontal, raised seat $v^1$ on which is fixed by screws or the like a cutting knife $v^2$ for cutting the strip into wrappers of proper lengths. The said head $V^3$ is provided with vertical wings $v^2$, and said wings are provided at their rear edges with inwardly turned flanges $v^3$ $v^3$ (Figs. 11 and 12). Between said vertical flanges $v^3$ and the raised knife supporting seat $v^1$ are located upper and lower jaw members $V^4$ $V^4$ which are yieldingly mounted in the head through the medium of upper and lower pairs of headed pins $v^5$ $v^5$ which extend through openings $v^6$ in said jaw members and are fixed in openings $v^7$ in the vertical flanges $v^3$ of the head. Said pins extend between the end wings $v^2$ of the head and the ends of the central knife supporting seat $v^1$, and they are located vertically a distance apart to space the jaw members a sufficient distance to permit the knife $v^2$ to pass therebetween, as will hereinafter more fully appear. Interposed between the heads of the said headed pins $v^5$ and the jaw members, and loosely surrounding the pins are spiral expansively acting springs $v^8$ $v^8$ which act to press the jaw members against the vertical ribs or flanges $v^3$ but permit said jaw members to yield backwardly relatively to the arm V and its head $V^3$. The said jaw members $V^4$ $V^4$ oppose a stationary jaw $V^6$ which is attached to the frame of the machine. The space separating said jaws is below the bight of the feed rollers $T^1$ $T^2$ and vertically above the inner wrapper receiving chamber $T^{30}$ and it is between these jaws that the paper is clamped while being cut by the knife $v^2$. The stationary jaw is provided in line with the space between the yielding jaw members with a groove $v^{10}$ to receive the knife when the movable jaw and knife are advanced. The operation of cutting the strip consists in first moving the movable jaw, comprising the members $V^4$ $V^4$ into contact with the fixed jaw. This is effected through the rocking of the shaft $V^1$ and arm V. Thereafter the spring pressed jaw members yield backwardly, as permitted by their backing springs $v^8$, while the knife $v^2$ advances to cut the paper gripped between the jaws. Thereafter the parts retract to their normal positions, as shown in Fig. 17, to free the severed wrapper and permit it to be folded or wrapped about the next gum advanced through the feed slot. The means for thus effecting the swinging or vibration of said arm V to produce the cutting effect described comprises an arm $V^{10}$ on the shaft $V^1$ (Fig. 2) that extends beneath the shaft $E^2$ and is provided with a bearing stud $v^{12}$ that engages a suitable cam groove in a cam $E^{25}$ fixed to said shaft.

When using wax paper or the like, it tends to stick to the clamping jaws between which the paper is clamped while being cut. In order to avoid this result, I provide stripper wires W W, (Figs. 3, 11 and 17) which are fixed at their upper ends to transverse horizontal shafts $W^1$ $W^1$ which shafts are rockingly mounted in the hanger arms $t^4$ and the upright standards $T^3$, respectively. Said shafts are placed under the influence of volute springs $w$ which tend to hold the lower ends of said wires out of contact with the jaws. The said springs $w$ tend to swing both wires toward the movable jaw but stops $w^1$ $w^1$, fixed to the shafts $W^1$ and bearing against the cross-bars $p^5$ $p^6$ of the roller shaft supporting and bearing frame serves to restrain the springs so that normally the wires, when the jaws are separated, are held free from the jaws. When the movable jaw is moved towards the stationary jaw, said stripper wires enter vertical notches or recesses $v^{15}$ $v^{16}$ in the movable and stationary jaws, respectively. After the strip of paper has been severed and the jaws separated, the stripper wires separate from the jaws under the action of the springs $w$, and assume the positions shown in Fig. 10, thereby stripping the severed wrapper and lower end of the strip from said jaws.

A take-up device may be applied to the inner wrapper strip between the roll and the upper end of the guide T to take up such slack in the strip as may be present at this place. As herein shown, said strip passes from the main roll to a guide roller at the top of the guide T over a directing roller Z mounted in the outer end of an arm $Z^1$ supported on the upper end of the standard $S^1$. $Z^2$ is a take-up roller engaging the strip between said directing roller and paper roll. Said take-up roller is mounted on the forward end of a lever $Z^4$ fixed to a rock-shaft $Z^5$ mounted in any suitable manner in the standard $S^1$. A link $Z^6$ connected at its upper end to said lever and at its lower end to the folding arm J (Fig. 1) rocks said take-up roller lever on its axis, in a manner that is obvious.

I claim as my invention:—

1. In a wrapping machine, means for feeding the article in a straight path, means for delivering a wrapper across said path whereby the article strikes the wrapper edgewise to effect the first side fold of the wrapper about the article, a swinging arm provided at its upper end with a swinging jaw adapted to receive the partially folded article, means for swinging said arm rearwardly and downwardly, means coöperating with said swinging arm to effect the further side folding of the article, a cam for operating said jaw to release said article at the downward limit of its swing, and means thereafter acting to complete the folding of the wrapper about the article.

2. In a wrapping machine, a wrapping mechanism embracing an initial and a final folding slot located at an angle to each other, means for delivering a wrapper together with the article to the initial folding slot to effect the partial side wrapping thereof, means for transferring the partially wrapped article to the final folding slot, means coöperating with said transferring means operating during said transfer to complete the side wrapping, and means for folding the end folds of the wrapper against the side of the package while occupying the final folding slot, one wall of said final folding slot being movable, thereby affording access to the slot for the purpose set forth.

3. In a wrapping machine, a wrapping mechanism embracing means for affecting the side folds of the wrapper about the article, and embracing also a final folding slot, into which the partially wrapped article is delivered one side wall of which latter slot is composed of members that are movable towards and from each other, and folding means for effecting the end folds of the wrappers.

4. In a wrapping machine, a wrapping mechanism embracing an initial and a final folding slot, means for delivering a wrapper together with an article to be wrapped to the initial folding slot to effect partial side wrapping of the article, means for transferring the partially wrapped article to the final folding slot, means coöperating with said transferring means operating during said transfer to complete the side wrapping, and means for effecting the folding of the end folds of the wrapper about the package when occupying said final folding slot, one of the walls of said final folding slot being composed of members that are yieldingly movable towards and from each other to open the slot.

5. In a wrapping machine, a wrapping mechanism embracing an initial and a final folding slot, means for delivering a wrapper together with an article to be wrapped to the initial folding slot to effect the partial side wrapping of the article, means for transferring the partially wrapped article to the final folding slot, means coöperating with said transferring means operating during said transfer to complete the side wrapping, means for folding the end folds of the wrapper against the package when occupying said final folding slot, one of the walls of said final folding slot being stationary, and spring-pressed arms which swing toward and from each other and provided with flanges which constitute the other wall of said final folding slot.

6. In a wrapping machine, a wrapping mechanism embracing an initial and a final folding slot, means for delivering a wrapper together with an article to an initial slot, means whereby the side folds of said wrapper are wrapped about the article during its passage through the first slot and its delivery to the final folding slot, preliminary folding fingers acting to fold the end folds of the wrapper at right angles to the package at the entering end of the slot, means for retaining said folds in this position during their advance through the final folding slot and final folding fingers acting to fold the end folds flat upon the package.

7. In a wrapping machine, a wrapping mechanism embracing an initial and a final folding slot, means for delivering a wrapper together with an article to the initial slot, means whereby the side folds of said wrapper are wrapped about the article during its passage through the first slot and its delivery to the final folding slot, preliminary folding fingers acting to fold the end folds of the wrapper at right angles to the package, movable retaining fingers operating to retain said folds in the right angle position as the gum advances through said final folding slot, and final folding fingers acting to fold the end folds flat upon the package.

8. In a wrapping machine, a wrapping mechanism embracing an initial and a final folding slot, means for delivering a wrapper together with an article to the first slot, means whereby the side folds of said wrapper are wrapped about the article during its passage through the first slot and its delivery to the final folding slot, preliminary folding fingers acting to fold the end folds of the wrapper at right angles to the package, retaining fingers operating to retain said folds in such position as the gum advances through said final folding slot, and final folding fingers acting to fold the end folds flat upon the package, said preliminary end folding fingers being yieldingly mounted so as to swing toward and away from each other at their advance ends, for the purpose set forth.

9. A wrapping machine embracing a wrapping mechanism, including an initial and a final folding slot, means for delivering a wrapper and an article to be wrapped therein to said initial slot, means acting on the wrapper to wrap the side folds of the wrapper about the article as it passes through said initial slot and is delivered to the final folding slot, means for folding the end folds of the wrapper at right angles to the package, creaser blades acting on the bases of said end folds to crease the same, means for retaining said end folds in this position during the advance of the package through said final slot, said retaining fingers acting, when advanced, to retract the creaser blades, and final folding fingers swinging toward and from each other to effect the final folding of the end folds of the wrapper against the side of the package.

10. A wrapping machine embracing a wrapping mechanism, including an initial and a final folding slot, means for delivering a wrapper and an article to be wrapped therein to said initial slot, means acting on the wrapper to wrap the side folds of the wrapper about the article as it passes through said initial slot, and is delivered to the final folding slot, preliminary end folding fingers acting on the end folds of the wrapper to fold them at right angles to the package, creaser blades acting on the bases of said end folds to crease the same, movable retaining fingers following the retiring movement of the preliminary folding fingers for retaining the end folds at right angles to the package during the advance of the package through said final folding slot, said retaining fingers acting, when advanced, to retract the creaser blades, and final folding fingers swinging toward and from each other to effect the final folding of the end folds of the wrapper against the side of the package.

11. In a wrapping machine, a wrapping mechanism embracing an initial and a final folding slot, means for delivering a wrapper together with an article to said initial slot, means whereby the side folds of said wrapper are wrapped about the article during its passage through the first slot and its delivery to the final folding slot, and means for folding the end folds of the wrapper comprising folding fingers acting to fold the end folds of the wrapper at right angles to the package, retaining fingers operating to retain said folds in such position as the gum advances through said final folding slot, final folding fingers acting to fold the end folds flat upon the package, spring devices for moving said preliminary folding fingers and the retaining fingers into their operative positions and positively actuated mechanism for retracting and holding retracted said fingers.

12. A wrapping machine embracing a wrapping mechanism, including an initial and a final folding slot, means for delivering a wrapper and an article to be wrapped to said initial slot, means acting on the wrapper to wrap the side folds of the wrapper about the article as it passes through said slot and is delivered to the final folding slot, means acting on the end folds of the wrapper to fold them at an angle to the package, creaser blades acting on the bases of said end folds to crease the same, retaining fingers for retaining the folds at said angle to the package during the advance of the package through said final folding slot, said retaining fingers acting, when advanced, to retract the creaser plates, and final folding fingers swinging toward and from each other to effect the final folding of the end folds against the side of the package.

13. A wrapping machine embracing a wrapping mechanism, including an initial and a final folding slot, means for delivering a wrapper and an article to be wrapped to said initial slot, means acting on the wrapper to wrap the side folds of the wrapper about the article as it passes through said slot and is delivered to the final folding slot, means acting on the end folds of the wrapper to fold them at an angle to the package, creaser blades acting on the bases of said end folds to crease the same, retaining fingers for retaining the folds at said angle to the package during the advance of the package through said final folding slot, said retaining fingers acting, when advanced, to retract the creaser plates, final folding fingers swinging toward and from each other to effect the final folding of the end folds against the side of the package, and a plate movable with said retaining fingers and adapted to hold the end folds of the wrapper flat against the package as the package is discharged from the final folding slot.

14. A machine for the purpose set forth, comprising wrapping mechanism, means for feeding wrappers and articles to be wrapped therein to said wrapping mechanism, a receiving chamber into which the wrapped articles are discharged one by one, an assembling chamber located at one side thereof, a plunger for transferring wrapped articles one at a time from the receiving to the assembling chamber, a yielding abutment in the assembling chamber against which the articles are forced thereinto, and a partition between the receiving chamber and assembling chamber and movable into and out of the path of said plunger.

15. A machine for the purpose set forth, comprising wrapping mechanism, means for feeding wrappers and articles to be wrapped therein to said wrapping mechanism, a receiving chamber into which the wrapped articles are discharged one by one, an assembling chamber located at one side thereof, a plunger for transferring wrapped articles one at a time from the receiving to the assembling chamber, a yielding abutment in the assembling chamber against which the articles are forced thereinto, a partition between the receiving chamber and assembling chamber and movable into and out of the path of said plunger, and operative connections between said plunger and partition for operating the latter through the reciprocating movement of the latter.

16. A machine for the purpose set forth, comprising wrapping mechanism, means for feeding the wrappers and articles to be wrapped thereby to the wrapping mechanism, said wrapping mechanism embracing a final folding slot downwardly through which the articles are discharged, a slotted turn-table located below said slot through which the discharged gums are directed, a receiving chamber below the turn-table, an assembling chamber laterally at one side of the receiving chamber, a plunger for transferring the wrapped articles one by one from the receiving to the assembling chamber, a yielding abutment against which the articles are transferred from the receiving to the assembling chamber, and a movable partition between said chambers which is controlled by the movement of said plunger.

17. A machine for the purpose set forth comprising wrapping mechanism, means for feeding the wrappers and articles to said wrapping mechanism, means whereby the wrapped articles are discharged from the wrapping mechanism one by one, a receiving chamber into which said articles are deposited, an assembling chamber communicating with and located at one side of the receiving chamber, a plunger reciprocating through the receiving chamber to transfer the wrapped articles to the assembling chamber, a swinging arm provided with fingers adapted to be moved upwardly through openings in the bottom wall of the assembling chamber to constitute a partition between the assembling and receiving chambers, and operative connections between said swinging arm and the plunger.

18. A machine for the purpose set forth comprising wrapping mechanism, means for feeding the wrappers and articles to said wrapping mechanism, means whereby the wrapped articles are discharged from the wrapping mechanism one by one, a receiving chamber into which said articles are deposited, an assembling chamber communicating with and located at one side of the receiving chamber, a plunger reciprocating through the receiving chamber to transfer the wrapped articles to the assembling chamber, a swinging arm provided with fingers adapted to be moved upwardly through an opening in the bottom wall of the assembling chamber to constitute a partition between the assembling and receiving chambers, operative connections between said swinging arm and the plunger, and a spring-pressed part on the side of the assembling chamber remote from the receiving chamber against the action of which the gums are forced into the receiving chamber, whereby said gums are retained upright between said part and said fingers.

19. A machine for the purpose set forth, comprising wrapping mechanism, means for feeding the wrappers and articles to said wrapping mechanism, means whereby the wrapped articles are discharged from the wrapping mechanism one by one, a receiving chamber into which said wrapped articles are deposited, an assembling chamber communicating with and located at one side of the receiving chamber, a plunger for transferring the wrapped articles to the assembling chamber, fingers adapted to be moved upwardly through the bottom wall of the assembling chamber to constitute a partition between the assembling and receiving chambers, and operative connections between said fingers and the plunger constructed to retire said fingers as the plunger is advanced to transfer a wrapped article to the assembling chamber and to move the fingers upwardly when the plunger is retracted.

20. A machine for the purpose set forth, comprising wrapping mechanism, means for feeding the wrappers and articles to said wrapping mechanism, means whereby the wrapped articles are discharged from the wrapping mechanism one by one, a receiving chamber into which said wrapped articles are deposited, an assembling chamber at one side of the receiving chamber, a plunger for transferring the wrapped articles to the assembling chamber, a swinging arm provided with fingers adapted to be moved upwardly through an opening in the bottom wall of the assembling chamber to constitute a partition between the assembling and receiving chambers, and operative connections between said swinging arm and the plunger comprising a rocker located at one side of the plunger to which said arm is attached, and provided with upwardly facing reversely disposed inclined margins and a spring pressed detent carried by the plunger provided with complemental inclined surfaces, said detent being free to swing in one direction and a shoulder limiting the swing of the detent in the opposite direction.

21. A machine for the purpose set forth comprising a wrapping mechanism, means for feeding articles and wrappers to said wrapping mechanism and for advancing the same therethrough, means for discharging the wrapped articles from the mechanism, a turn-table provided with a slot through which the articles are discharged from the wrapping mechanism, and yielding converging plates in the ends of said slot of the turn-table for the purpose set forth.

22. A machine for the purpose set forth, comprising wrapping mechanism, means for feeding the wrappers and articles to said mechanism, means for advancing said articles and wrappers through the wrapping mechanism and folding the wrappers about the articles, means whereby the wrapped articles are discharged from the wrapping mechanism one at a time, a receiving chamber into which said articles are deposited, an assembling chamber communicating with said receiving chamber, means for transferring the wrapped articles from the receiving to the assembling chamber, and a swinging arm provided with fingers which latter constitute a partition between the receiving and assembling mechanisms and are designed by the movement of said arm to be moved into and out of the path of the transferring means.

In testimony, that I claim the foregoing as my invention I affix my signature in the presence of two witnesses, this 27th day of October A. D. 1906.

HARRY YARRINGTON ARMSTRONG.

Witnesses:
  HOMER C. KING,
  EDWARD C. BILLINGS.